(12) United States Patent
Balmer

(10) Patent No.: US 11,674,542 B2
(45) Date of Patent: Jun. 13, 2023

(54) ASSEMBLY COMPRISING A SUPPORT, A PLATE AND FASTENING MEANS, IN PARTICULAR FOR A TIMEPIECE

(71) Applicant: ETA SA MANUFACTURE HORLOGERE SUISSE, Grenchen (CH)

(72) Inventor: Raphael Balmer, Vicques (CH)

(73) Assignee: ETA SA MANUFACTURE HORLOGERE SUISSE, Grenchen (CH)

( * ) Notice: Subject to any disclaimer, the term of this patent is extended or adjusted under 35 U.S.C. 154(b) by 629 days.

(21) Appl. No.: 16/715,473

(22) Filed: Dec. 16, 2019

(65) Prior Publication Data

US 2020/0200205 A1  Jun. 25, 2020

(30) Foreign Application Priority Data

Dec. 21, 2018 (EP) .................................... 18215659

(51) Int. Cl.
*F16B 35/04* (2006.01)
*F16B 25/00* (2006.01)
*G04B 29/02* (2006.01)

(52) U.S. Cl.
CPC ........ *F16B 25/0015* (2013.01); *G04B 29/027* (2013.01)

(58) Field of Classification Search
CPC ...... G04B 31/06; G04B 29/04; G04B 29/027; F16B 25/0057; F16B 25/0015
USPC ........... 368/88, 318, 316; 411/386, 411, 412
See application file for complete search history.

(56) References Cited

U.S. PATENT DOCUMENTS

| 2,167,558 A * | 7/1939 | Upson ................. F16B 25/0047 411/918 |
| 3,020,702 A | 2/1962 | Feldman |
| 3,898,791 A * | 8/1975 | Wolber ................. G04C 10/00 968/503 |
| 4,463,753 A * | 8/1984 | Gustilo ................. A61B 17/72 411/386 |
| 4,472,075 A * | 9/1984 | Forni ................... G02C 5/2281 464/112 |
| 4,876,677 A * | 10/1989 | Moriya ................. G04G 17/02 968/878 |
| 6,053,653 A * | 4/2000 | Tanaka ................. F16B 5/0275 411/413 |

(Continued)

FOREIGN PATENT DOCUMENTS

| CN | 2181702 Y | 11/1994 |
| CN | 1549901 A | 11/2004 |

(Continued)

OTHER PUBLICATIONS

Communication dated Feb. 24, 2021, from the Japanese Patent Office in application No. 2019-224235.

(Continued)

*Primary Examiner* — Gary W Estremsky
(74) *Attorney, Agent, or Firm* — Sughrue Mion, PLLC

(57) ABSTRACT

An assembly including horological movement support, a motor plate of a timepiece and a fastener fastening the support to the plate. The fastener includes a self-tapping screw having a body that passes through a hole in the support. A recess in the plate or support is tapped when the screw is screwed into the recess. The shape of the recess has a variable width, which is wider at the opening extending to a smaller diameter at the bottom of the recess, the shape corresponding to that of the body of the screw.

16 Claims, 2 Drawing Sheets

(56) References Cited

U.S. PATENT DOCUMENTS

| | | | |
|---|---|---|---|
| 6,349,758 B1* | 2/2002 | Bell | B22C 9/082 164/397 |
| 7,070,376 B1* | 7/2006 | Toback | F16B 25/0068 411/417 |
| 8,303,634 B2* | 11/2012 | Martin | A61B 17/863 411/413 |
| 8,678,732 B2* | 3/2014 | Balbo Di Vinadio | B65C 9/1819 411/386 |
| 2009/0101384 A1 | 4/2009 | Kawasaki et al. | |
| 2011/0005056 A1* | 1/2011 | Gigandet | G04B 11/04 29/428 |
| 2016/0076576 A1 | 3/2016 | Stahl et al. | |
| 2016/0202666 A1* | 7/2016 | Saito | G04B 19/02 368/80 |
| 2020/0033804 A1* | 1/2020 | Di Domenico | G04B 13/026 |

FOREIGN PATENT DOCUMENTS

| | | |
|---|---|---|
| CN | 204572689 U | 8/2015 |
| CN | 204631455 U | 9/2015 |
| CN | 105556140 A | 5/2016 |
| EP | 0 654 717 A1 | 5/1995 |
| FR | 1 234 518 A | 10/1960 |
| FR | 2 519 159 A1 | 7/1983 |
| JP | 51-49064 U | 4/1976 |
| JP | 894772 A | 4/1996 |
| JP | 10115688 A | 5/1998 |
| JP | 2000249775 A | 9/2000 |
| JP | 3433749 B2 | 8/2003 |
| JP | 2007247067 A | 9/2007 |
| JP | 2009105610 A | 5/2009 |
| JP | 2009217047 A | 9/2009 |
| JP | 2018155737 A | 10/2018 |

OTHER PUBLICATIONS

Office Action dated Jan. 29, 2021 from the China National Intellectual Property Administration in Application No. 201911327097.6.

European Search Report for Corresponding EP 18 21 5659, dated Jun. 24, 2019.

Communication dated Sep. 17, 2021 by the Chinese Patent Office in Chinese Application No. 201911327097.6.

* cited by examiner

ASSEMBLY COMPRISING A SUPPORT, A PLATE AND FASTENING MEANS, IN PARTICULAR FOR A TIMEPIECE

CROSS REFERENCE TO RELATED APPLICATIONS

This application claims priority to European Patent Application No. 18215659.6 filed Dec. 21, 2018, the entire contents of which are incorporated herein by reference.

TECHNICAL FIELD OF THE INVENTION

The present invention relates to the field of assemblies comprising a support, a plate and fastening means, in particular a support for a horological movement and a motor plate of a timepiece.

BACKGROUND OF THE INVENTION

Techniques for assembling a module with a support, for example a horological movement support and a motor plate of a timepiece, are known to use self-tapping screws as fastening means in the watchmaking field. This type of screw is inserted into a recess having a smooth wall, and wherein they form a tapping when screwed into the recess.

FIG. 1 shows one example of a self-tapping screw 1 of the prior art. The screw 1 comprises an enlarged head 2 and a longitudinal body 3, a first section 4 whereof arranged opposite the head 2 is smooth, and a second section 5 running from the head 2 to the first section 4 is surrounded by a spiral threading 6. The first section 4 is narrower than the second section 5 and has a diameter close to that of the recess. The first section allows the screw to be positioned inside the recess in order to hold it straight. When the screw 1 is screwed into the recess, the threading 6 is gradually pressed into the wall of the recess, since the diameter of the second section with the threading 6 is wider than that of the recess.

These screws are, for example, practical for assembling a support of a horological movement with a motor plate of a timepiece. More specifically, recesses are preformed without any tapping, the support is positioned on the plate, and the screws are screwed into the recesses. One of the two elements, for example the plate, is provided with the one or more recesses, preferably made in a material that is softer than the metal screw, for example plastic. Thus, each screw taps a recess and assembles the two elements with one another.

However, a first drawback of such a screw lies in the fact that it must be screwed for a relatively long time in order to tap the recess and fasten the screw therein. More specifically, the tapping occurs gradually, since only part of the threading at the end of the second section forms the tapping. Thus, each screw requires a certain number of screw turns, and thus a substantial handling time, whereas, as a whole, mounting operations must be carried out quickly.

Another drawback involves the prior positioning of the screw inside the recess before screwing. More specifically, the sole purpose of the first section is to guide and not to tap the recess such that a part of the recess receiving the first section is not intended to fasten the screw inside the recess. Thus, the first section is relatively short so as to prevent the loss of too much space, since the element must not be too thick and take up too much space, which would be inconvenient in a watch case for example. Since the first section is short, the screw is not well maintained inside the recess before screwing, and could easily come out of the recess.

SUMMARY OF THE INVENTION

The purpose of the present invention is in particular to overcome the different drawbacks of the known devices of the prior art.

More specifically, one purpose of the invention is to provide an assembly that is both easy and fast to assemble and that guarantees secure holding of the support with the plate.

Another purpose of the invention is to provide an assembly that is robust and inexpensive.

Another purpose of the invention is to provide an assembly that can be assembled and disassembled several times.

For these purposes, the invention relates to an assembly comprising a support and a plate, in particular a horological movement support and a motor plate of a timepiece, in addition to means for fastening the support to the plate, the fastening means comprising:
- a self-tapping screw configured to form a tapping when screwed, the screw comprising a head and a longitudinal body, the body comprising an end opposite the head and a threading arranged around the body, the body having a diameter that varies along the first axis of the body, which is wider at the head and extends to a smaller diameter at the end,
- a first hole passing through the support or the plate,
- a recess respectively arranged in the plate or the support according to the arrangement of the first hole, the recess having a shape defined by a wall and an opening for receiving the body of the screw, such that, with the body of the screw passing through the first hole, the shape of the recess is tapped when the screw is screwed into the recess.

The device is noteworthy in that the predefined shape of the recess has a variable width, which is wider at the opening extending to a smaller diameter at the bottom of the recess, the shape corresponding to that of the body of the screw.

Thus, since the recess is wider at the opening than at the bottom of the recess, it adapts to the shape of the screw at several levels. On the one hand, a larger part of the screw can be inserted into the recess prior to screwing. The screw is better held inside the recess, in a direction corresponding to the screwing direction. This feature facilitates screwing since there is no need to hold the screw by hand or using an instrument in order to screw it, since the screw is guided by the recess without any risk of it coming out of the recess.

On the other hand, since the body of the screw and the recess have a substantially identical shape, the threading of the screw is more quickly brought into contact with the wall along the entire height of the body of the screw. As a result, screwing requires fewer turns in order to achieve full screwing of the screw inside the recess.

According to one specific embodiment of the invention, the threading is arranged along the entire length of the body. Thus, the whole body of the screw contributes to the fastening. There is no part of the body of the screw inside the recess that does not contribute to the fastening with the recess, which is not the case in the prior art described hereinabove.

According to one specific embodiment of the invention, the body of the screw is cylindrical and comprises at least two cylindrical sections, a first section at the end of the body and a second section upstream of the first section, the second section being wider than the first section.

According to one specific embodiment of the invention, the recess comprises at least two cylindrical sections, a first section extending from the opening of the recess and a second section located deeper inside the recess, the first section being wider than the second section.

According to one specific embodiment of the invention, the body of the screw and the recess each have a conical shape, a base of a cone being arranged at the head as regards the screw and a base of another cone being formed by the opening as regards the recess.

According to one specific embodiment of the invention, the bottom of the recess opposite the opening is closed.

According to one specific embodiment of the invention, the recess is extended by a retaining flange arranged above a second hole passing through the stator and the core of the motor, when the plate includes the recess.

According to one specific embodiment of the invention, the flange is wider than the second hole, such that the stator and the core are held against the plate.

According to one specific embodiment of the invention, the recess is made of a deformable material, for example plastic, such as polyethersulphone or polypropylene, potentially with glass fibre reinforcement.

According to one specific embodiment of the invention, the screw is made of metal.

According to one specific embodiment of the invention, the body of the screw has a length that is substantially equal to the length of the recess and that of the first hole.

According to one specific embodiment of the invention, the head is wider than the first hole.

According to one specific embodiment of the invention, the assembly comprises a motor module provided with the plate and a motor configured so as to move the horological movement borne by the support, the motor being provided with a coil core, a stator and a circuit for actuating the motor, which are held by the plate.

BRIEF DESCRIPTION OF THE FIGURES

Other features and advantages of the invention will appear more clearly upon reading the following detailed description of one example embodiment of the invention, said example being provided for the purposes of illustration only and not intended to limit the scope of the invention, given with reference to the accompanying drawing, wherein.

DETAILED DESCRIPTION OF THE INVENTION

Figure 1:
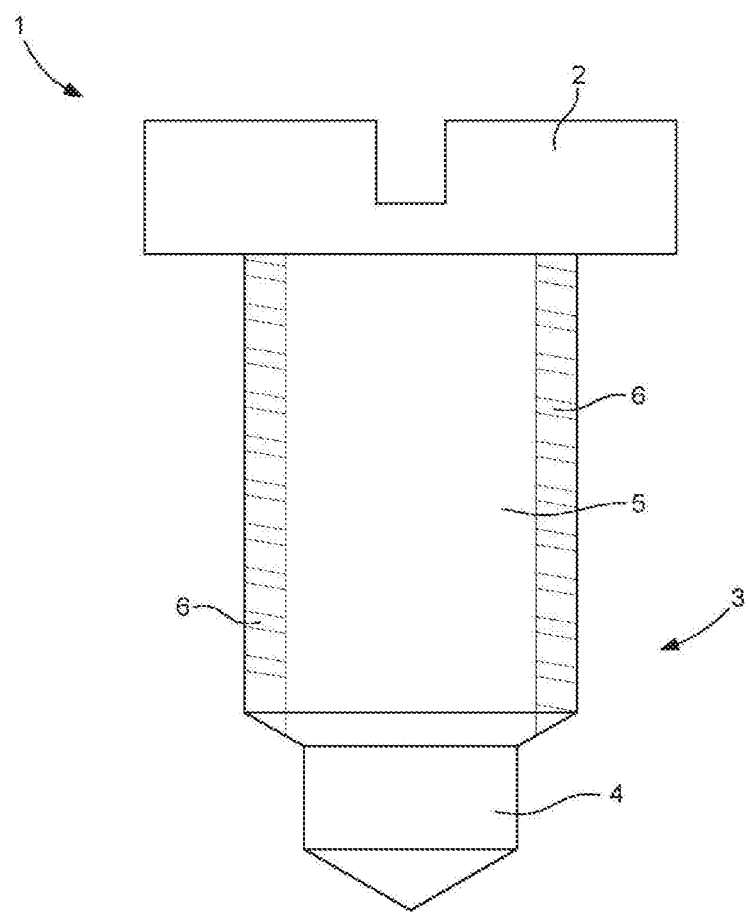
FIG. 1 is a sectional view of a self-tapping screw according to one known embodiment of the prior art.
Figure 2:
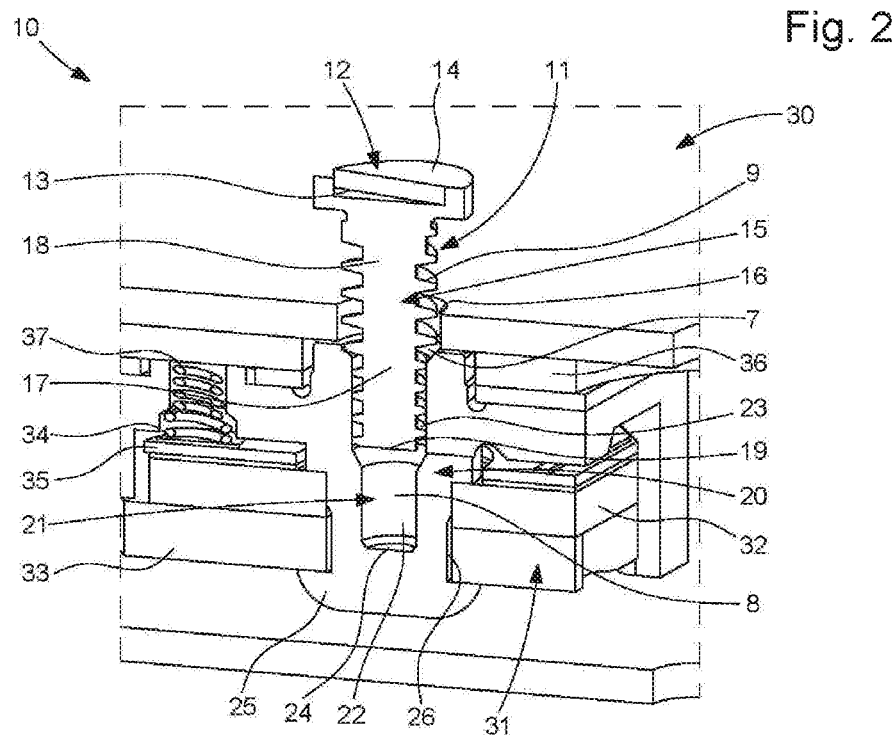
FIG. 2 is a diagrammatic, sectional view of an assembly according to the invention when the screw is held inside the recess before screwing.
Figure 3:
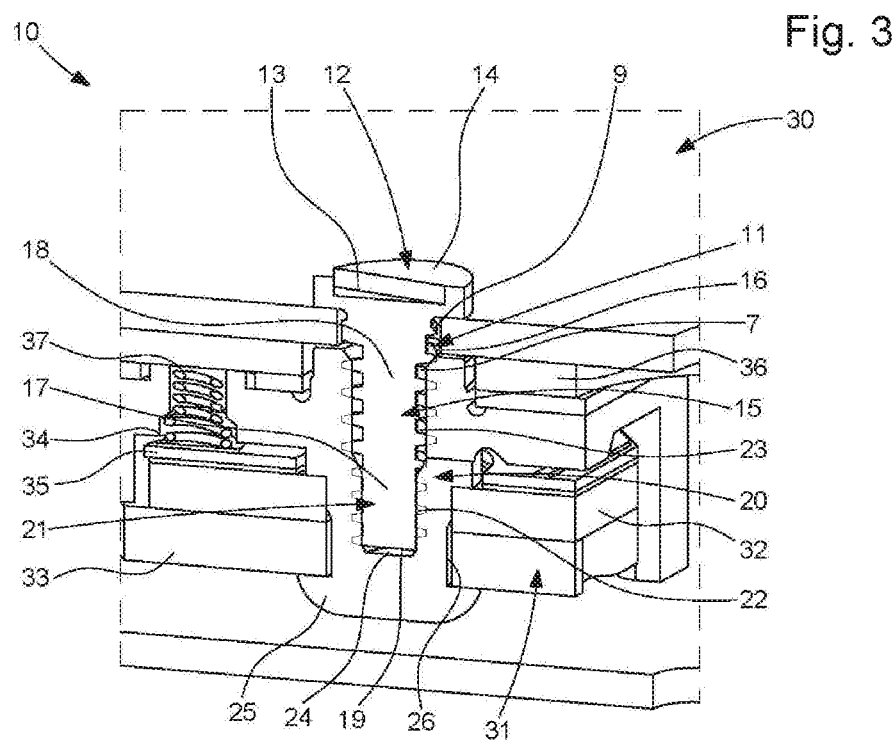
FIG. 3 is a diagrammatic, sectional view of an assembly according to the invention when the screw is inserted into the recess after screwing.

In FIGS. 2 and 3, the assembly 10 comprises a horological movement support 30 of a timepiece such as a wristwatch. The movement, which is not shown in the figures, as a whole allows the hands to be moved over a dial of the timepiece. The assembly comprises a motor module provided with a plate 20 and a motor 31 configured so as to move the horological movement borne by the support 30. The motor 31 is provided with a stator 33 and a coil core 32 in order to actuate a rotor, not shown in the figures, as well as an electronic control circuit 36 of the motor 31, and a circuit 35 for actuating the coil in order to actuate rotation of the rotor. The stator 33, the core 32 and the actuation circuit 35 are held beneath the plate 20, whereas the electronic control circuit 36 is arranged between the plate 20 and the support 30, when the plate 20 and the support 30 are assembled together. A spring 34 allows a connection to be made between the control circuit 36 and the actuation circuit 35 in order to transmit an electric current and allow actuation of the coil. The spring 34 is disposed in a passage 37 through the plate in order to connect the two circuits.

The assembly 10 further comprises means for fastening the support 30 to the plate 20. Thus, the two elements are fastened to one another in order to be placed in the timepiece. The fastening means comprise a self-tapping screw 11 and a recess 21 arranged in the plate 20, as well as a first hole 16 passing through the support 30.

The screw 11 comprises a head 12 and a longitudinal body 15 about a first axis, the body 15 comprising an end 19 opposite the head 12 and a threading 9 arranged around the body 15. The head 12 includes a disc 14 provided with a slot 13 allowing the screw to be rotated by a screwdriver. The slot 13 is straight in the figures, however it can also be cruciform or have any other conventional shape for a screw. The end 19 is flat in this case, however it could also be pointed. The threading 9 has a helical shape with a predetermined pitch and width. The pitch of the threading is, for example, equal to 0.25 mm.

The recess 21 is formed in the plate 20 of the motor about a second longitudinal axis. The recess 21 has a predefined shape comprising an inner wall 8 delimiting the shape, as well as an opening 7 for the passage of the screw 11. The bottom 24 of the recess 21 opposite the opening 7 thereof is preferably closed. The recess 21 is extended by a retaining flange 25 arranged beyond a second hole 26 made through the stator 33, the actuation circuit 35 and the core 32 of the motor 31. The wall 8 of the recess 21 passes through the second hole 26, whereby the bottom 24 of the recess 21 is partially formed by the flange 25. The flange 25 is wider than the second hole 26 such that it retains the stator 33, the actuation circuit 35 and the core 32 against the plate.

When the screw 11 is screwed into the recess 21, the body 15 passes through the first hole 16, whereas, since the disc 14 of the head 12 is wider than the first hole 16, the head 12 remains blocked on the support 30, outside of the first hole 16. The first and second axes are substantially collinear after screwing, as well as before screwing, when the screw is partially positioned inside the recess.

Preferably, the body 15 of the screw 11 has a length that is substantially equal to the length of the recess 21 and that of the first hole 16. Thus, the assembly is prevented from being too thick or from taking up too much space, for example in a watch case.

The screw 11 is configured such that it forms a tapping inside the recess 21 when it is screwed therein. For this purpose, the threading 9 is configured such that it is pressed into the wall 8 of the recess 21 during screwing. The body 15 and the threading 9 of the screw 11 are preferably made of a hard material, whereas the wall 8 of the recess 21 is made of a material that is softer than that of the screw 11. Thus, the threading 9 of the screw 11 easily taps the wall 8 of the recess 21. The screw 11 is, for example, made of metal, preferably of free-cutting steel. The recess 21 is made of a deformable material, for example a plastics material, such as polyethersulphone or polypropylene, potentially with glass fibre reinforcement.

The body 15 of the screw 11 has a diameter that varies according to the first axis of the body, the body 15 being wider beneath the head 12 extending to a smaller diameter at the end 19.

According to the invention, the predefined shape of the recess 21 has a variable width corresponding to that of the body 15 such that the predefined shape of the recess 21 and the body 15 of the screw 11 engage with one another so that the body 15 of the screw 11 is held by the recess 21 along the entire height of the body 15 after screwing. Moreover, the width of the screw 11 comprising the body 15 and the threading 9 is greater than that of the recess 21 at the same height, when the screw is screwed into the recess. Thus, the threading 9 taps the recess 21, regardless of the height thereof on the body 15.

In a first embodiment shown in FIGS. 2 and 3, the body 15 of the screw 11 is cylindrical and comprises at least two cylindrical sections 17, 18, a first section 17 extending from the end 19 of the body 15, and a second section 18 extending upstream of the first section 17, for example from the head 12 of the screw 11 as far as the first section 17. The second section 18 is wider than the first section.

Thus, according to the invention, the shape of the recess 21 comprises at least two cylindrical sections, a first section 23 extending from the opening 7 of the recess, and a second section 22 located deeper inside the recess 21, the first section 23 being wider than the second section 22.

According to various alternatives to the first embodiment, not shown in the figures, the body of the screw and the recess can have three or four sections, or more depending on the length of the screw.

Thanks to the invention, the variation in the width of the body 15 and the corresponding shape of the recess 21 allows a large part of the threading 9 to tap the recess 21 simultaneously. Thus, screwing is faster than with a conventional screw which taps the recess gradually with a single part of the threading. This saves time since the screw requires less handling, i.e. fewer screw turns. For example, for a screw of the same length and same pitch, a conventional self-tapping screw requires up to six screw turns, whereas a screw according to the invention only requires three turns.

Moreover, as shown in FIG. 2, the screw 11 is held well by the recess 21 before screwing thanks to the corresponding shapes of the screw 11 and that of the recess 21 according to the invention. More specifically, the part of the body of the screw extending from the end can be inserted into a first part of the recess 21 so as to be vertically held in place before screwing. In this embodiment, the first section 17 extending from the end 19 of the body 15 is inserted into the first section 23, running from the opening 7 of the recess 21, without the threading tapping the wall 8. This results in an excellent level of holding of the screw in the right direction before screwing, so as to prevent any risk of the screw from falling or from being guided in the wrong direction.

Advantageously, the width of the screw at the first section 17 of the body 15 of the screw 11 with the threading 9 is substantially equal to the width of the first section 23 of the recess 21.

Preferably, the threading 9 is arranged along the entire length of the body 15. Thus, the whole body 15 of the screw 11 contributes to tapping the recess 21 and to fastening the support 30 and the plate 20 to one another. In the first embodiment, the threading 9 is thus arranged on the two cylindrical sections 17, 18 of the body 15. As shown in FIG. 3 after screwing, the first section 17 of the body 15 has tapped the second section 22 of the recess 21, whereas the second section 18 of the body 15 has tapped the first section 22 of the recess 21. The two tappings are thus produced simultaneously, which requires fewer screw turns.

In the alternative embodiment having an even greater number of sections, screwing is even faster since the tappings of each section of the recess are made simultaneously.

In a second embodiment, not shown in the figures, the body of the screw and the recess each have the shape of a cone. The first cone of the body of the screw has a base disposed beneath the head as regards the screw, whereas the tip is arranged at the end of the body. The second cone formed by the recess includes a base formed by the opening, the tip being formed by the bottom of the recess. In the second embodiment, the threading is preferably arranged along the entire height of the first cone. The same advantages as those procured by the first embodiment are obtained. In particular, screwing is even faster, since the conical shape causes a large part of the threading to tap the recess simultaneously over the entire height of the body.

It goes without saying that this invention is not limited to the embodiments described above and that various simple alternatives and modifications of the invention can be considered by a person skilled in the art without leaving the scope of the invention as defined by the accompanying claims. In particular, according to an alternative not shown in the figures, the first hole is arranged in the plate and the recess is arranged in the support.

The invention claimed is:

1. An assembly (10) comprising a support (30) and a plate (20), in particular a horological movement support (30) and a motor (31) plate (20) of a timepiece, in addition to means for fastening the support (30) to the plate (20), the fastening means comprising:
   a self-tapping screw (11) configured to form a tapping when screwed, the screw (11) comprising a head (12) and a longitudinal body (15), the body (15) comprising an end (19) opposite the head (12) and a threading (9) arranged around the body (15), the body having a diameter that varies along the first axis of the body (15), which is wider at the head (12) and extends to a smaller diameter at the end (19),
   a first hole (16) passing through the support (30) or the plate (20),
   a recess (21) respectively arranged in the plate (20) or the support (30) according to the arrangement of the first hole (16), the recess (21) having a shape defined by a wall (8) and an opening (7) for receiving the body (15) of the screw (11),
   such that, with the body (15) of the screw (11) passing through the first hole (16), the predefined shape of the recess (21) is tapped when the screw is screwed into the recess,
   characterized in that the shape of the recess (21) has, by a plurality of tapered portions thereof, a variable width, which is wider at the opening (7) extending to a smaller diameter at the bottom (24) of the recess (21), the shape corresponding to that of the body (15) of the screw (11).

2. The assembly according to claim 1, characterized in that the threading (9) is arranged along the entire length of the body (15).

3. The assembly according to claim 1, characterized in that the body (15) of the screw (11) is cylindrical and comprises at least two cylindrical sections, a first section (17) at the end (19) of the body (15) and a second section (18) upstream of the first section (17), the second section (18) being wider than the first section (17).

4. The assembly according to claim 3, characterized in that the recess (21) comprises at least two cylindrical sections, a first section (23) extending from the opening (7) of the recess (21), and a second section (22) located deeper inside the recess (21), the first section (23) being wider than the second section (22).

5. The assembly according to claim 1, characterized in that the body of the screw and the recess each have a conical shape, a base of a cone being arranged at the head as regards the screw and a base of another cone being formed by the opening as regards the recess.

6. The assembly according to claim 1, characterized in that the bottom (24) of the recess (21) opposite the opening (7) thereof is closed.

7. The assembly according to claim 1, characterized in that the recess (21) is extended by a retaining flange (25) arranged beyond a second hole (26) passing through the stator (33) and the core (32) of the motor, when the plate (20) includes the recess (21).

8. The assembly according to claim 7, characterized in that the flange (25) is wider than the second hole (26), such that the stator (33) and the core (32) are held against the plate (20).

9. The assembly according to claim 1, characterized in that the recess (21) is made of a deformable material, for example plastic, such as polyethersulphone or polypropylene, potentially with glass fibre reinforcement.

10. The assembly according to claim 1, characterized in that the screw (11) is made of metal.

11. The assembly according to claim 1, characterized in that the body (15) of the screw (11) has a length that is substantially equal to the length of the recess (21) and that of the first hole (16).

12. The assembly according to claim 1, characterized in that the head (12) is wider than the first hole (16).

13. The assembly according to claim 1, comprising a motor module provided with the plate (20) and a motor (31) configured so as to move the horological movement borne by the support (20), the motor (31) being provided with a coil core (32), a stator (33) and a circuit (35) for actuating the motor (31), which are held by the plate (20).

14. The assembly according to claim 1, wherein
the opening (7) of the recess (21) comprises a first of the tapered portions,
a second of the tapered portions is located midway between the opening (7) and the bottom (24) of the recess (21), and
a narrowest part of the first of the tapered portions is wider than a narrowest part of the second of the tapered portion.

15. The assembly according to claim 14,
wherein the recess (21) comprises a constant width portion from the narrowest part of the first of the tapered portions to a widest part of the second of the tapered portions.

16. An assembly (10) comprising a support (30) and a plate (20), in particular a horological movement support (30) and a motor (31) plate (20) of a timepiece, in addition to means for fastening the support (30) to the plate (20), the fastening means comprising:
a self-tapping screw (11) configured to form a tapping when screwed, the screw (11) comprising a head (12) and a longitudinal body (15), the body (15) comprising an end (19) opposite the head (12) and a threading (9) arranged around the body (15), the body having a diameter that varies along the first axis of the body (15), which is wider at the head (12) and extends to a smaller diameter at the end (19),
a first hole (16) passing through the support (30),
a recess (21) arranged in the plate (20), the recess (21) having a shape defined by a wall (8) and an opening (7) for receiving the body (15) of the screw (11),
such that, with the body (15) of the screw (11) passing through the first hole (16), the predefined shape of the recess (21) is tapped when the screw is screwed into the recess,
characterized in that the shape of the recess (21) has a variable width, which is wider at the opening (7) extending to a smaller diameter at the bottom (24) of the recess (21), the shape corresponding to that of the body (15) of the screw (11), and
characterized in that the recess (21) is extended by a retaining flange (25) arranged beyond a second hole (26) passing through the stator (33) and the core (32) of the motor.

* * * * *